(12) United States Patent
Radjassamy

(10) Patent No.: US 7,340,635 B2
(45) Date of Patent: Mar. 4, 2008

(54) REGISTER-BASED DE-SKEW SYSTEM AND METHOD FOR A SOURCE SYNCHRONOUS RECEIVER

(75) Inventor: Rajakrishnan Radjassamy, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1157 days.

(21) Appl. No.: 10/376,390

(22) Filed: Feb. 28, 2003

(65) Prior Publication Data

US 2004/0170240 A1 Sep. 2, 2004

(51) Int. Cl.
*G06F 1/12* (2006.01)

(52) U.S. Cl. ........................ 713/503; 713/500
(58) Field of Classification Search ......... 713/500–503
See application file for complete search history.

(56) References Cited

U.S. PATENT DOCUMENTS 5,768,529 A * 6/1998 Nikel et al. ................. 709/232

| | | | |
|---|---|---|---|
| 6,199,135 B1 | 3/2001 | Maahs et al. | |
| 6,292,116 B1 | 9/2001 | Wang et al. | |
| 7,028,171 B2 * | 4/2006 | Sheaffer | 712/224 |

* cited by examiner

*Primary Examiner*—Rehana Perveen
*Assistant Examiner*—Paul Yanchus

(57) ABSTRACT

A register-based de-skew system and method for a source synchronous receiver circuit domain. In one embodiment, a de-skew strobe generator operates responsive to at least one incoming strobe signal in order to generate a plurality of one-hot de-skew strobe signals. A plurality of de-skew registers receive the same input data pulses from a transmitter circuit domain. By clocking the de-skew registers with the one-hot de-skew strobe signals, the input data pulses are stretched into spread data pulses having an extended timing window. A plurality of multiplexers multiplex the spread data pulses, whereupon the multiplexed data is registered using a clock signal associated with the receiver circuit domain.

29 Claims, 7 Drawing Sheets

REGISTER-BASED DE-SKEW SYSTEM AND METHOD FOR A SOURCE SYNCHRONOUS RECEIVER

BACKGROUND

Digital electronic systems, e.g., computer systems, often comprise a number of circuit domains that need to communicate with one another using different interfaces, each running at an optimized speed for increased performance. Typically, multiple clock signals having related frequencies are utilized for providing appropriate timing to the interfaces. For instance, a clock signal with a particular frequency may be provided separately to two circuits that are physically spaced apart, wherein one circuit is operable to transmit data to the other. Where data is to be transferred at high rates between a transmitting circuit and a receiving circuit, strobe signaling is also provided by the transmitting circuit via a separate but matched trace such that data may be registered accurately at the receiving end.

Although strobing is more effective than common-clock mode for effectuating error-free data transfer between two synchronous circuit domains, signal skew remains an important factor in the design of digital electronic systems due to the inherent variability of signal tracing and physical placement of the constituent circuit domains. Latches are typically used in conventional implementations for reducing the skew effect with respect to strobed data transfers. Whereas such arrangements have been deemed to be generally useful, several deficiencies persist, however. First, there is the possibility that the duration of valid data can be variable with a latch-based implementation because the latching operation is dependent on when the data pulses arrive with respect to a de-skewed strobe's active state. Additionally, the latched data pulses may be shorter than the incoming data's pulse width, i.e., one or more runt data pulses may be obtained as a result of latching. Not only does the creation of runt pulses reduce the overall efficiency of data registration by the receiving circuitry, but it may also contribute to increased sampling errors. Further aggravation is also induced because of the general complexity of latch-based de-skewing techniques.

SUMMARY

A register-based de-skew system and method for a source synchronous receiver circuit domain are described. In one embodiment, a de-skew strobe generator operates responsive to at least one incoming strobe signal in order to generate a plurality of one-hot de-skew strobe signals. A plurality of de-skew registers receive the same input data pulses from a transmitter circuit domain. By clocking the de-skew registers with the one-hot de-skew strobe signals, the input data pulses are stretched into spread data pulses having an extended timing window. A plurality of multiplexers multiplex the spread data pulses, whereupon the multiplexed data is registered using a clock signal associated with the receiver circuit domain.

DETAILED DESCRIPTION OF THE DRAWINGS

Figure 1:
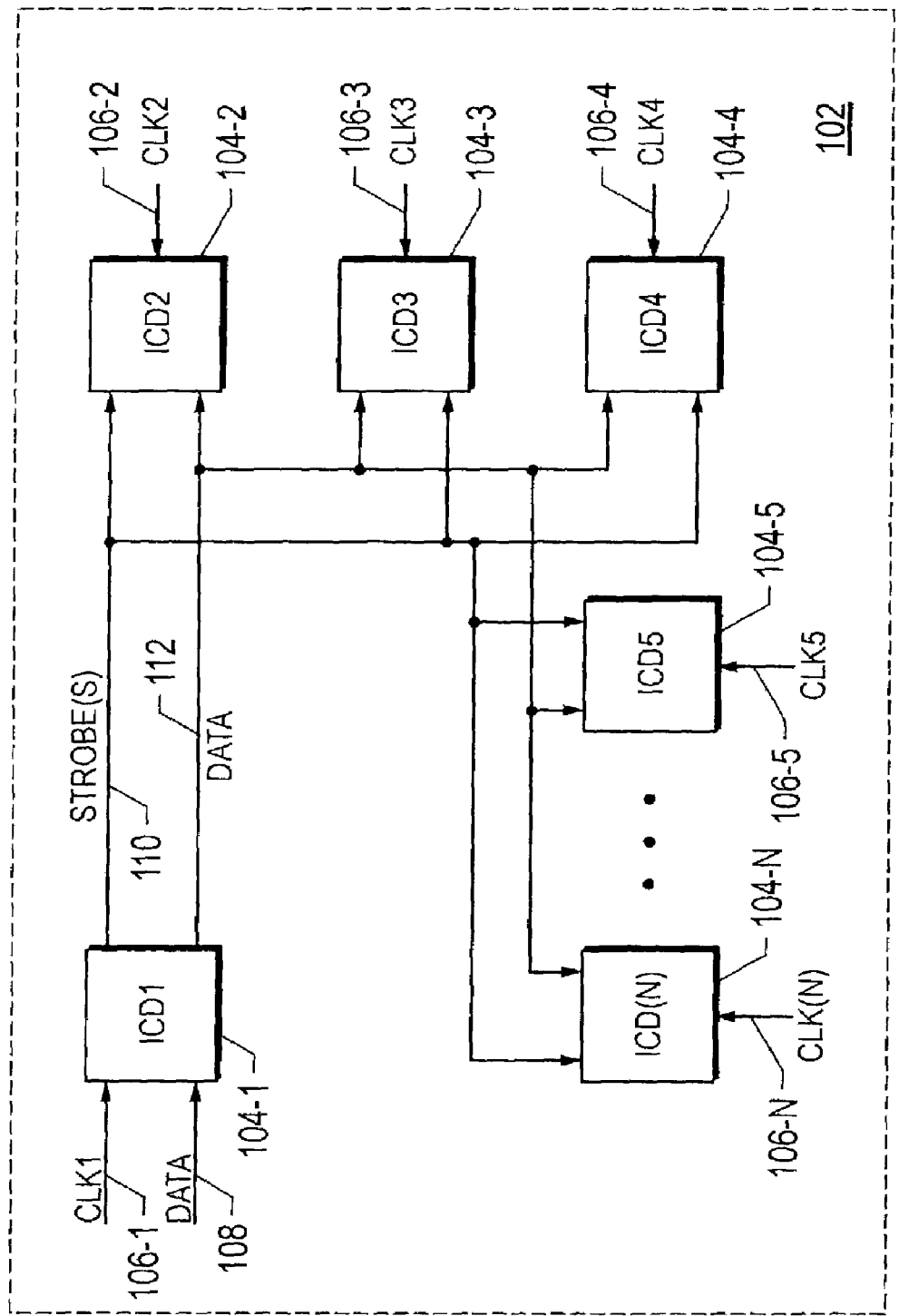
FIG. 1 depicts a functional block diagram of a digital electronic system embodiment where multiple integrated circuit domains disposed at different locations communicate with each other using strobe signaling.

In the drawings, like or similar elements are designated with identical reference numerals throughout the several views thereof, and the various elements depicted are not necessarily drawn to scale. Referring now to FIG. 1, depicted therein is a functional block diagram of an exemplary digital electronic system 102 having multiple integrated circuit domains (ICDs) disposed at different locations wherein an embodiment of a de-skew design of the present invention may be advantageously implemented. Reference numerals 104-1 through 104-N refer to ICD1 through ICD (N) that communicate with each other using strobe signaling for data transfer operations, each ICD operating responsive to its own clock signal (reference numerals 106-1 through 106-N) that is synchronous with respect to the other clock signals. In one application, ICD1 104-1 is operable to receive data 108 from another domain external to the electronic system 102, wherein the data is clocked out using CLK1 106-1 on a data path 112 that fans out to the remaining ICDs. Also, to synchronize data registration operations by the receiving ICDs that are disposed at variable distances with respect to the transmitting ICD1 104-1, one or more strobe signals are provided by ICD1 104-1 via a strobe path 110 that extends to the remaining ICDs. Receiver circuitry in the receiving ICDs operates to capture the incoming data pulses using the strobe signals, whereupon the data may be forwarded to the ICD core circuitry for further operations.

Figure 2:
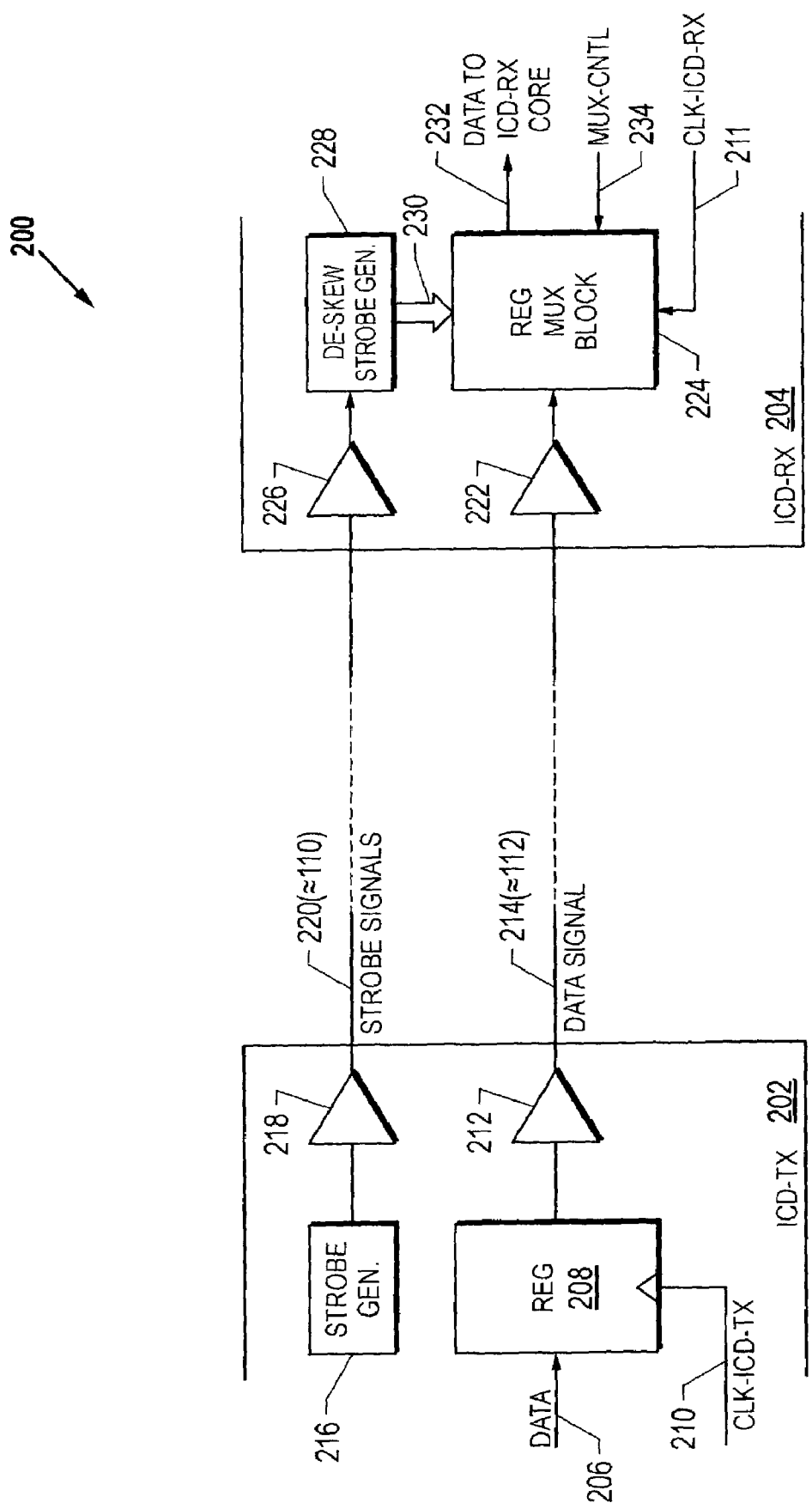
FIG. 2 depicts a functional block diagram of a generic transmitter and receiver combination of the electronic system embodiment shown in FIG. 1 for transferring data from the transmitter circuit domain to the receiver circuit domain that is synchronized to the source, i.e., the transmitter.

FIG. 2 depicts a functional block diagram of an embodiment of a generic transmitter and receiver ICD combination subsystem 200. Reference numeral 202 refers to a data transmitting ICD (ICD-TX) that is operable with a clock signal labeled as CLK-ICD-TX 210. Outgoing data 206 is registered using a register stage 208 that is clocked with CLK-ICD-TX 210 before being presented to a driver buffer circuit 212. A strobe generator 216 is operable to generate one or more strobe signals (for example, depending on whether one or more single-ended strobe signals or double-ended strobes are used) which are driven by a strobe driver/buffer circuit 218. Data path 214 carrying data pulses and strobe path 220 carrying strobe signal(s) interface with respective incoming driver/buffer circuits 222 and 226 of a receiver ICD (ICD-RX) 204. As will be seen in additional detail hereinbelow, signal skew introduced in the strobe signaling that is used in connection with transferring data from ICD-TX 202 to ICD-RX 204 may be de-skewed using a register-based de-skew circuit that comprises a de-skew strobe generator 228 and a register-multiplexer (REGMUX) block 224 that is operable responsive to a multiplex control signal (MUX-CNTL) 234 and clock signal (CLK-ICD-RX) 211. Since the receiving ICD operates with CLK-ICD-RX 211 that is synchronous to the clock signal of the transmitting ICD, the receiver circuitry of ICD-RX may be referred to as source synchronous receiver circuitry. Essentially, input data pulses provided by the receiver driver/buffer 222 are staged through a plurality of de-skew registers that are controlled by a corresponding plurality of de-skew strobe signals 230 provided by the generator circuitry 228, wherein only one strobe signal is active at any one time (i.e., "one-hot") so that the incoming data pulses are stretched over an expanded timing window to ensure proper registration.

Taking FIGS. 1 and 2 together, it should be apparent to one skilled in the art that the subsystem 200 described above is an embodiment that essentially captures a subportion of the electronic system 102 shown in FIG. 1. Accordingly, data signal path 214 and strobe signal path 220 illustrated in FIG. 2 are operable analogous to the data signal path 112 and strobe signal path 110 depicted in FIG. 1.

Figure 3:
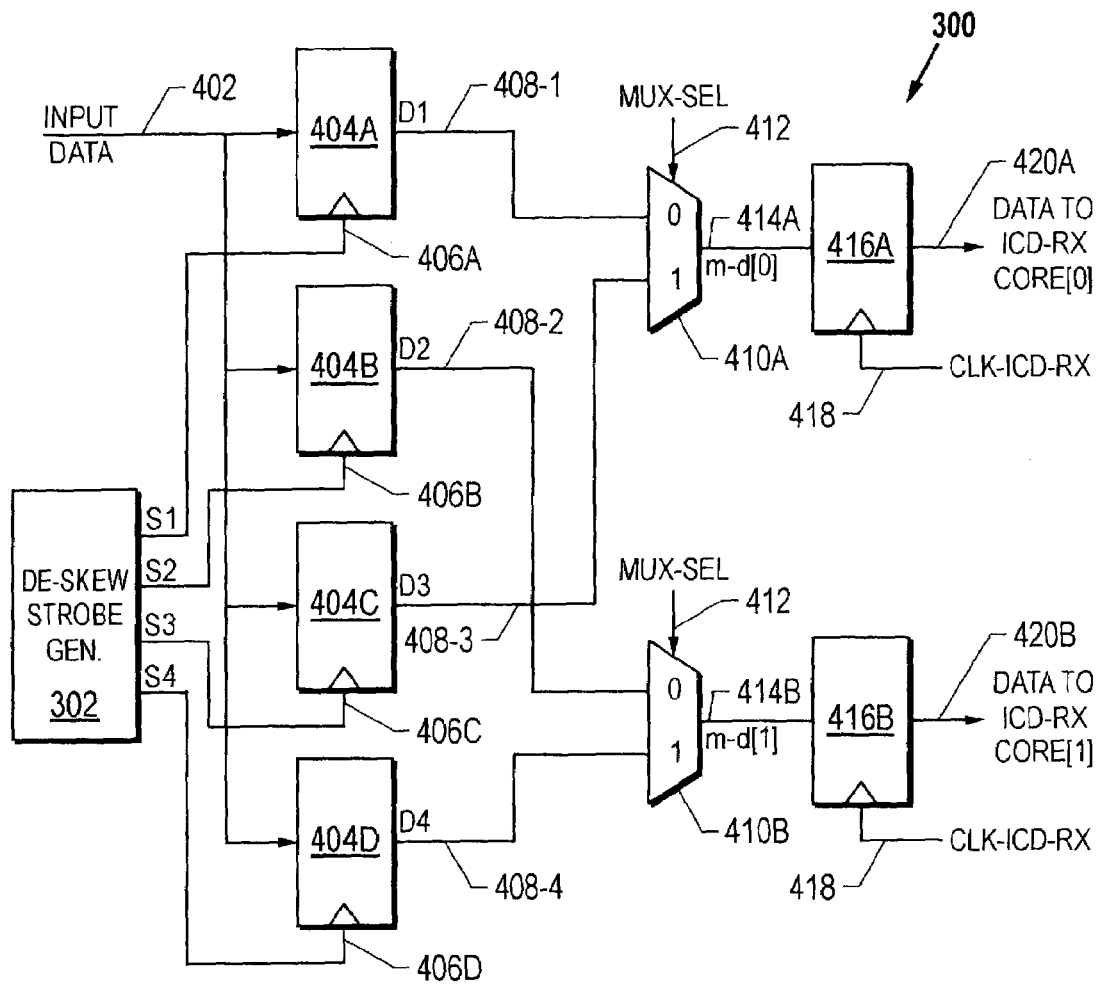
FIG. 3 depicts an embodiment of a de-skew system for de-skewing the clocking signals associated with transferring data from a transmitter circuit domain to a receiver circuit domain.

Referring now to FIG. 3, depicted therein is an embodiment of a register-based de-skew system 300 that is operable as REGMUX block 224 described above in conjunction with a de-skew strobe generator 302 for compensating for strobe signal skew using four one-hot de-skew strobe signals (S1-S4) 406A-406D. Incoming data from a transmitter domain is first captured by the receiver driver/buffer circuitry (not shown in this FIG.), which is then provided as input data pulses 402 to four de-skew registers 404A-404D, each of which is clocked by a corresponding de-skew strobe signal. The timing of the de-skew strobes is such that each de-skew register is operable to hold a particular input data pulse for a timing window that is four times the width of the de-skew strobe pulse. For example, if each de-skew strobe pulse is 2 nanoseconds, the de-skew registers are operable to hold the data for 8 nanoseconds before another data pulse is registered thereat. Accordingly, the D1-D4 outputs 408-1 through 408-4 may be referred to as spread data pulses or de-skewed data pulses corresponding to four input data pulses originated from the transmitter domain.

A plurality of multiplexer (MUX) elements may be provided for appropriately selecting/sampling the spread data pulses into multiplexed data. In the embodiment depicted, two 2:1 MUX elements 410A and 410B are provided such that MUX 410A receives the data input from D1 408-1 and D3 408-3 and MUX element 410B receives the data input from D2 408-2 and D4 408-4. A control signal, MUX-SEL 412, generated by a MUX-SEL generator (not shown), is provided to the 2:1 MUXes for toggling between the two inputs in order to generate multiplexed data m-d[0] 414A and m-d[1] 414B, respectively. A bank of data capture registers, each operating to register the multiplexed data emanating from a corresponding MUX element, are provided for capturing and clocking the output data using a clock signal associated with the receiver domain, i.e., CLK-ICD-RX 418. In the case of two MUXes, register 416A is operable with m-d[0] 414A for clocking out data pulses D1 and D3 as DATA-TO-RX-CORE [0] 420A. In similar fashion, register 416B is operable with m-d[1] 414B for clocking out data pulses D2 and D4 as DATA-TO-RX-CORE[1] 420B.

Figure 4:
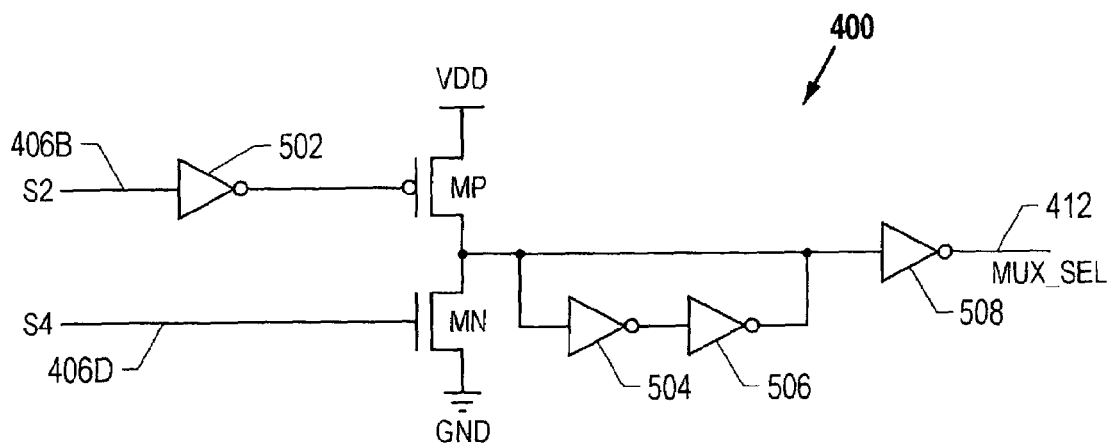
FIG. 4 depicts an embodiment of a circuit for generating multiplexer control signals for use with the de-skew system shown in FIG. 3.

FIG. 4 depicts an embodiment of a circuit 400 for generating MUX-SEL 412 for use with the de-skew system described above. As can be seen, a subset of the de-skew strobe signals, i.e., de-skew strobes signals S2 406B and S4 406D, are utilized by a block of logic gates for manufacturing MUX-SEL 412. S2 406B is inverted by inverter 502 whose output is provided to the gate of a P-channel MOSFET MP that is coupled in series to an N-channel MOSFET MN. S4 406D is provided directly to the gate of the MN device. Output from the common node between MP and MN devices is staged through a latch formed from, for example, inverters 504 and 506, in order to hold the correct logic state associated with the MUX-SEL signal. The latch output is inverted by inverter 508 to be operable as MUX-SEL 412. In essence, the logic circuit embodiment 400 operates such that assertion of S4 sets MUX-SEL 412 to a logic "1" state, while assertion of S2 clears MUX-SEL 412 to a logic "0" state.

Figure 5:
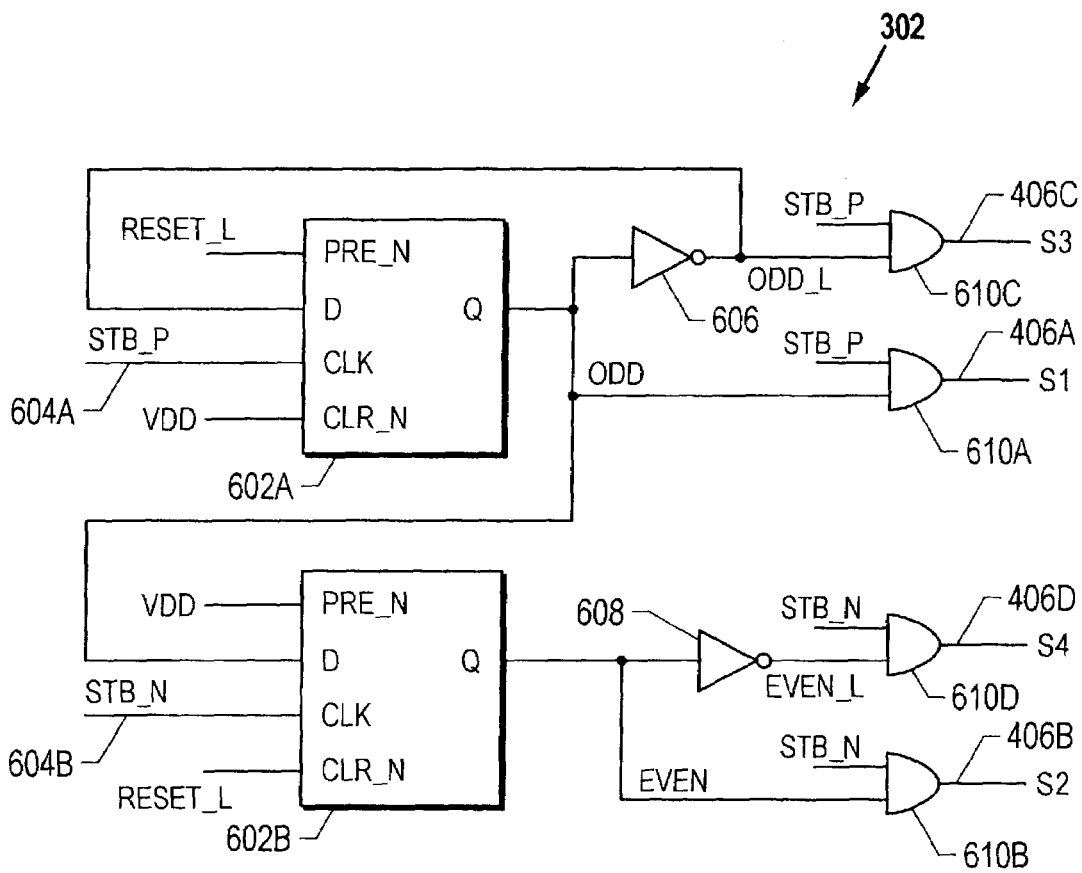
FIG. 5 depicts an embodiment of a circuit for generating de-skew strobe signals for use with the de-skew system shown in FIG. 3.

Referring now to FIG. 5, shown therein is an embodiment of the de-skew strobe signal generator 302 for generating S1-S4 signals described hereinabove. In the embodiment depicted, the incoming strobe signaling is exemplified by way of a pair of complementary strobe signals, STB_P 604A and STB_N 604B, which are used by a pair of D flip-flops (FF) 602A, 602B and a block of logic for manufacturing S1 406A through S4 406D. Strobe inputs STB_P and STB_N are applied to the CLK inputs of FF 602A and FF 602B, respectively. Whereas the Q' output of FF 602A is looped back to the D input of FF 602B without any change in its logic state, it is inverted by an inverter 606 whose output is looped back to the D input of FF 602B. Further, the output from the inverter 606 is ANDed with STB_P by an AND gate 610C for generating the S3 de-skew strobe signal 406C. The uninverted Q output from FF 602A is also ANDed with STB_P by an AND gate 610A to generate the S1 de-skew strobe signal 406A. In similar fashion, the Q output from FF 602B is utilized in conjunction with STB_N for manufacturing the remaining S2 and S4 signals. An inverter 608 inverts the Q output, which is ANDed with STB_N by an AND gate 610D to generate the S4 de-skew signal 406D. The STB_N signal is also ANDed with the uninverted Q output from FF 602B by means of an AND gate 610B to generate the S2 de-skew strobe signal 406B.

Figure 6:
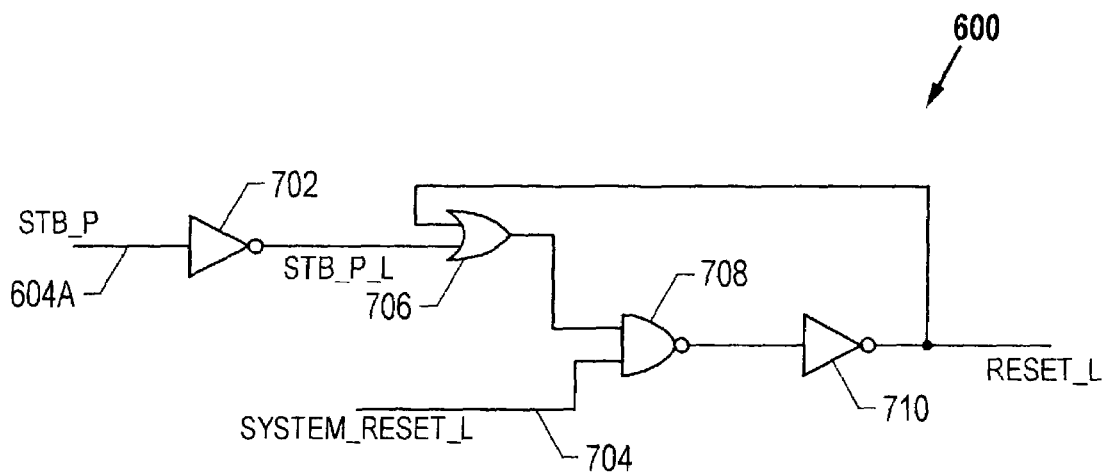
FIG. 6 depicts an embodiment of a circuit for generating a RESET control signal for use with the de-skew strobe generator shown in FIG. 5.

An active low RESET_L signal is applied to the PRE_N and CLR_N inputs of FF 602A and 602B, respectively, in order to ensure that the S1-S4 sequence starts after the first rising edge of the incoming STB_P signal upon activation of a system reset. FIG. 6 depicts an embodiment of a circuit 600 for generating the RESET control signal for use with the de-skew strobe signal generator 302. The STB_P signal 604A is inverted by an inverter 702, which is then provided to an input of an OR gate 706. The RESET_L signal is applied as another input to the OR gate 706 in a feedback loop. A SYSTEM_RESET_L signal 704 is NANDed with the output of the OR gate by means of a NAND gate 708, whose output is inverted by an inverter 710 for generating the RESET_L signal.

Figure 7A:
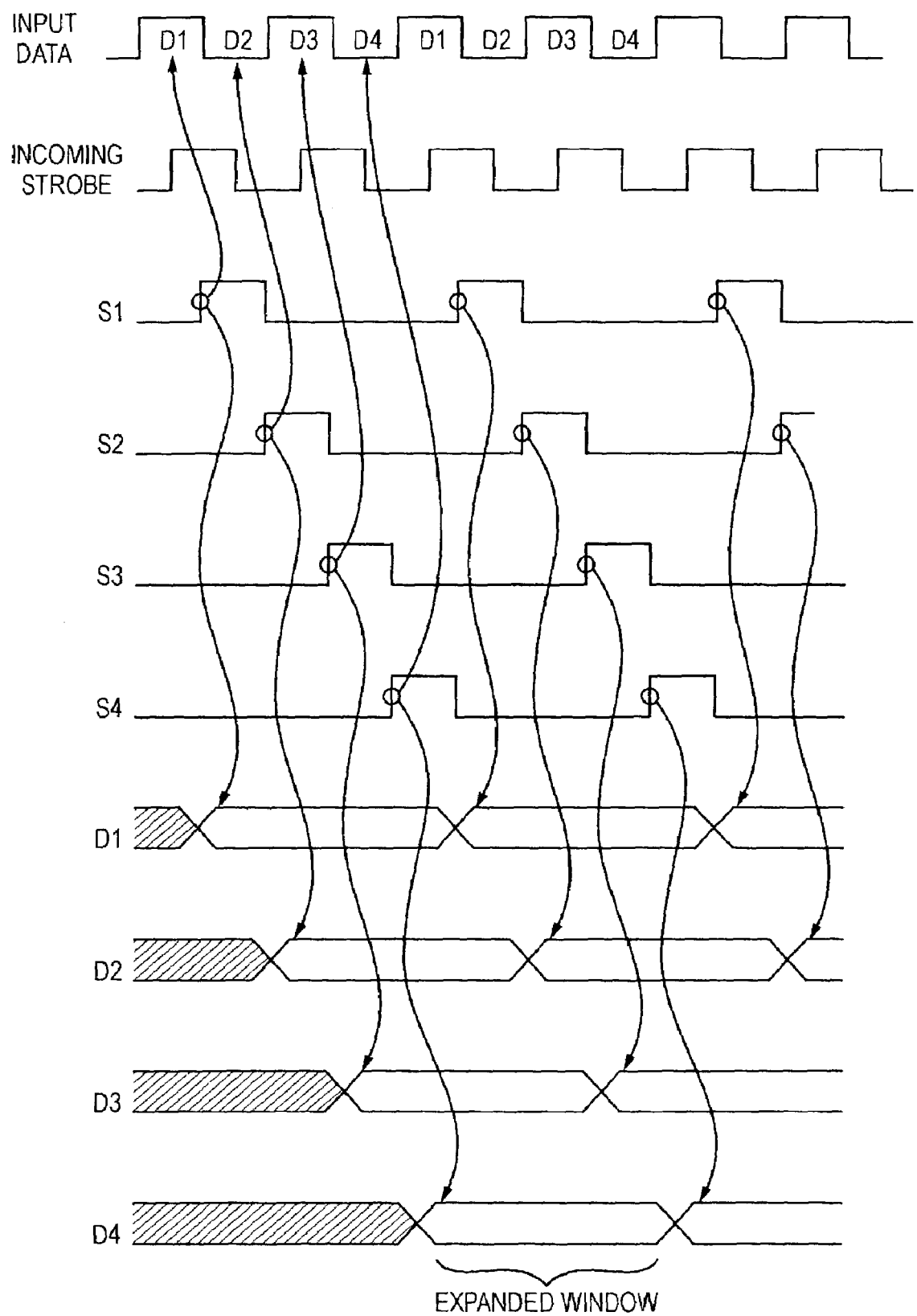
FIGS. 7A and 7B depict a timing drawing relating to a de-skew system embodiment having four de-skew strobe signals.
Figure 7B:
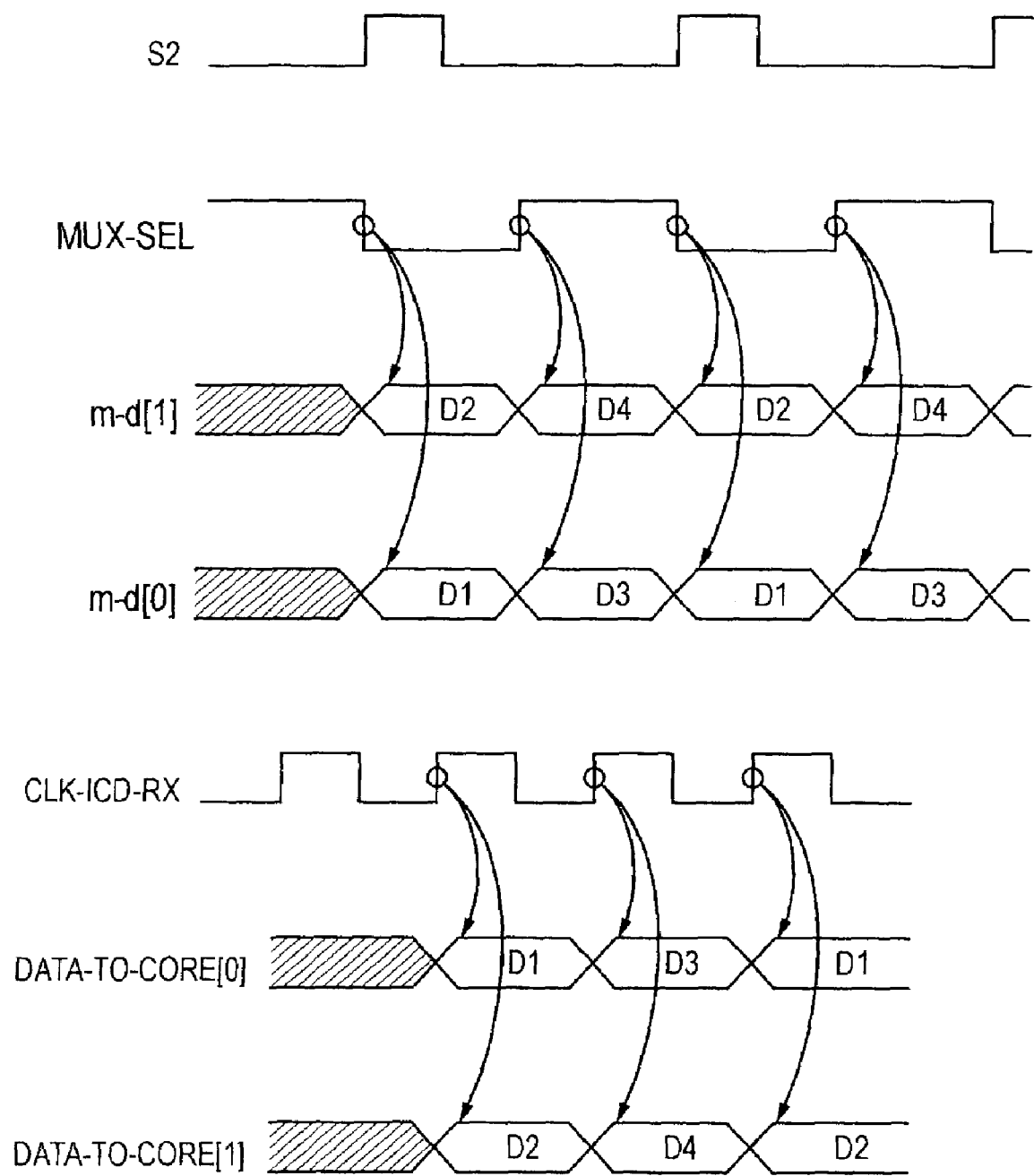

FIGS. 7A and 7B depict a timing drawing relating to the operation of a de-skew system embodiment having four de-skew strobe signals such as the S1-S4 signals set forth above. Input data pulses D1 through D4 and associated strobe signaling (exemplified as a single strobe signal) are provided to the de-skew system of a receiver ICD. Four de-skew strobe signals, S1-S4, are generated such that only one signal is driven high for any time pulse. Accordingly, for a data stream clocked at a rate of 2 ns/pulse, each of the de-skew strobe signals is active for a 2 ns window and remains quiescent for 6 ns. Additionally, the timing of the S1-S4 signals is such that each de-skew strobe signals's rising edge occurs in the middle of the corresponding data pulse. Thus, the rising edge of S1 is used for registering the D1 data pulse, the rising edge of S2 is operable for registering the D2 data pulse, and so on. Since the de-skew strobe signals are one-hot, the D1-D4 data pulses are held by the corresponding de-skew registers for an expanded timing window, in this case, of 8 ns. The rising and falling edges of MUX-SEL control the 2:1 MUX elements coupled to the de-skew registers such that when it is driven low, D1 and D2 are provided as MUX outputs m-d[0] and m-d[1], respectively. Likewise, when MUX-SEL is driven high, D3 and D4 are provided as the MUX output. As set forth above, the data capture registers coupled to the 2:1 MUX elements are clocked with CLK-ICD-RX, where each rising edge clocks the data to be sent out to the core circuitry of the receiving ICD as DATA-TO-CORE[0] and DATA-TO-CORE[1] with D1/D3 and D2/D4 pulse combinations, respectively.

Figure 8:
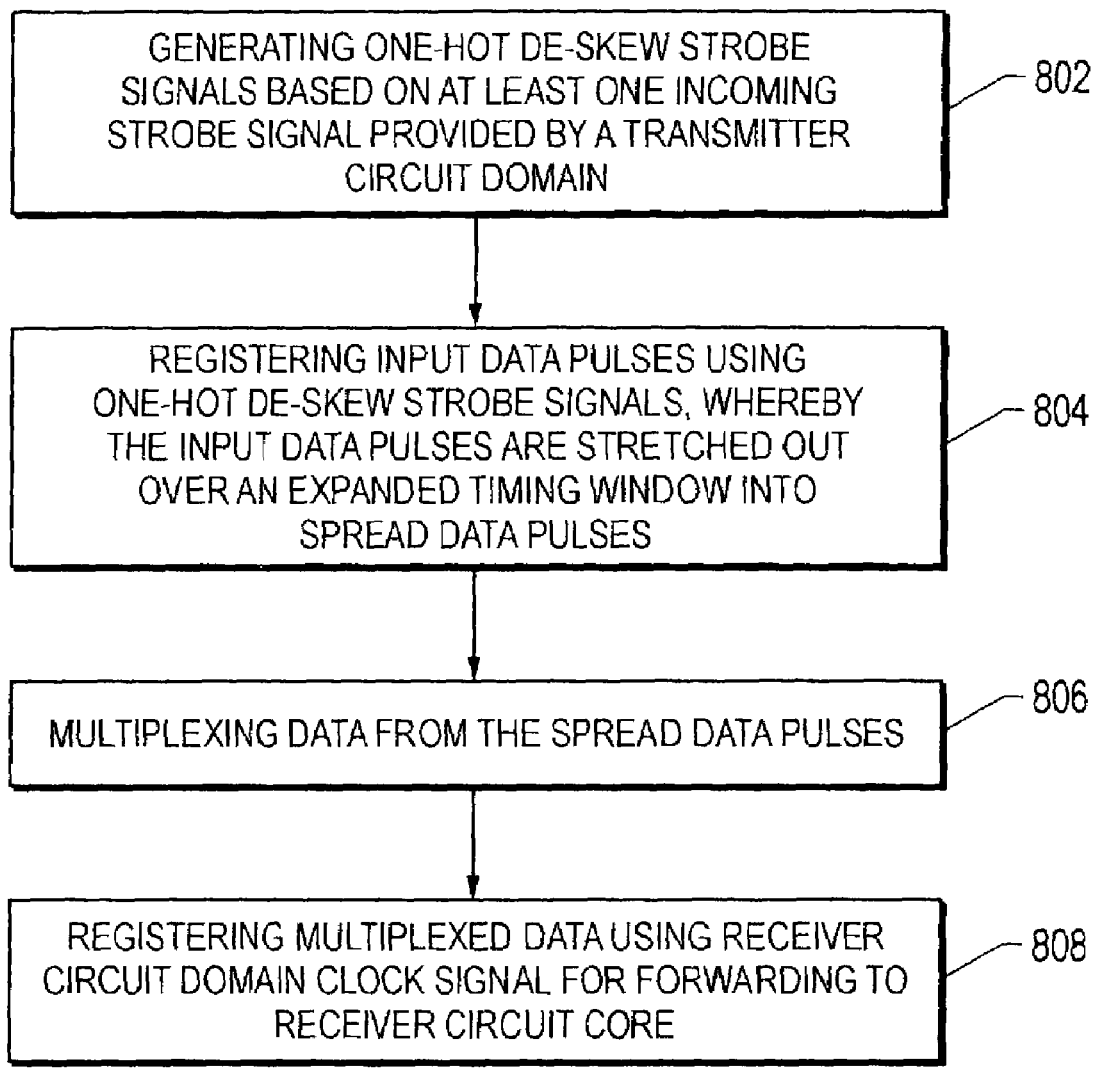
FIG. 8 depicts a flow chart of the operations involved in one embodiment of a method for transferring data to a source synchronous receiver circuit having a plurality of de-skew strobe signals.

FIG. 8 depicts a flow chart of the operations involved in one embodiment of a method of the present invention for transferring data to a source synchronous receiver circuit using de-skewed strobe signals. Based on at least one incoming strobe signal provided by a transmitter circuit domain, a plurality of one-hot de-skew strobe signals are generated (block 802). The input data pulses are registered using the one-hot de-skew strobe signals, whereby the data pulses are "stretched out" over an expanded timing window into what may be referred to as spread data pulses (block 804). A MUX arrangement is operable to multiplex the data from the spread data pulses (block 806), which is registered thereafter using a clock signal associated with the source synchronous receiver circuit domain for forwarding to its core (block 808).

Based on the foregoing Detailed Description, it should be appreciated that a de-skew strobe system and method provided in accordance herewith is advantageous over the existing solutions involving latches because the incoming data is registered for a known period of time for accurately sampling the data, rather than being susceptible to the possibility that there can be a variable skew between the incoming strobes and the receiver circuit domain's system clock due to the signal trace layout. Further, the data pulses are maintained over an expanded timing window instead of creating runt data pulses as is usually the case with latch-based data receiver circuitry implementations.

Although the aforesaid Detailed Description has been set forth with reference to certain illustrations, it is to be understood that the forms of the invention shown and described are to be treated as exemplary embodiments only. For instance, various logic modules, control signals and their logic levels illustrated in the FIGURES of the present patent application may be implemented using a number of different electronic devices and/or gate combinations, with any level of integration. Accordingly, various changes, substitutions and modifications can be realized therein without departing from the spirit and scope of the invention as defined by the appended claims.

What is claimed is:

1. A de-skew system for a source synchronous receiver, comprising:
    a de-skew strobe generator for generating a plurality of de-skew strobe signals based on at least an incoming strobe signal, wherein only one of said deskew strobe signals will be active at a time;
    a plurality of de-skew registers for receiving input data originated from a transmitting domain at a particular clock frequency, each of said deskew registers operating responsive to a corresponding one of said plurality of de-skew strobe signals for spreading out a respective input data pulse over an expanded timing window into a spread data pulse;
    a bank of multiplexer (MUX) elements coupled to said de-skew registers for multiplexing data from each of said spread data pulses; and
    a bank of data capture registers coupled to said bank of MUX elements for capturing said multiplexed data in response to a clock signal associated with said source synchronous receiver.

2. The de-skew system for a source synchronous receiver as set forth in claim 1, wherein said plurality of de-skew registers comprises four de-skew registers, each of which registers operating responsive to one of four de-skew strobe signals generated by said de-skew strobe generator.

3. The de-skew system for a source synchronous receiver as set forth in claim 2, wherein said bank of MUX elements comprises two 2:1 MUX elements, a first 2:1 MUX element operating to multiplex spread data pulse outputs of first and third de-skew registers and a second 2:1 MUX operating to multiplex spread data pulse outputs of second and fourth de-skew registers.

4. The de-skew system for a source synchronous receiver as set forth in claim 3, wherein a first data capture register is operable to capture multiplexed data from said first 2:1 MUX element.

5. The de-skew system for a source synchronous receiver as set forth in claim 4, wherein a second data capture register is operable to capture multiplexed data from said second 2:1 MUX element.

6. The de-skew system for a source synchronous receiver as set forth in claim 5, wherein each of said 2:1 MUX elements is controlled by a control signal manufactured from second and fourth de-skew strobe signals.

7. The de-skew system for a source synchronous receiver as set forth in claim 5, wherein said four de-skew strobe signals are manufactured by said de-skew strobe generator responsive to a pair of incoming strobe signals.

8. The de-skew system for a source synchronous receiver as set forth in claim 7, wherein said de-skew strobe generator includes:
    a first flip-flop whose clock input is coupled to a first one of said pair of incoming strobe signals;
    a second flip-flop whose clock input is coupled to a second one of said pair of incoming strobe signals; and
    a combinational logic block coupled to outputs of said first and second flipflops for generating said four de-skew strobe signals.

9. The de-skew system for a source synchronous receiver as set forth in claim 8, wherein said combinational logic block includes four 2-input AND gates.

10. The de-skew system for a source synchronous receiver as set forth in claim 7, wherein said input data is clocked such that each input data pulse is about 2 nanoseconds.

11. The de-skew system for a source synchronous receiver as set forth in claim 10, wherein said spread data pulse associated with each input data pulse is about 8 nanoseconds.

12. A de-skewing method for use with a source synchronous receiver circuit domain, comprising:
    generating a plurality of one-hot de-skew strobe signals based on at least an incoming strobe signal from a transmitter circuit domain;
    registering, responsive to said one-hot de-skew strobe signals, each input data pulse from said transmitter circuit domain into a respective register so as to stretch each input data pulse into a spread data pulse over an extended timing window;

multiplexing data from said spread data pulses; and registering multiplexed data using a clock signal associated with said source synchronous receiver circuit domain.

13. The de-skewing method for use with a source synchronous receiver circuit domain as set forth in claim 12, further comprising the operation of forwarding said multiplexed data upon registration to core circuitry associated with said source synchronous receiver circuit domain.

14. The de-skewing method for use with a source synchronous receiver circuit domain as set forth in claim 12, wherein two single-ended incoming strobe signals are provided for manufacturing four de-skew strobe signals.

15. The de-skewing method for use with a source synchronous receiver circuit domain as set forth in claim 14, wherein said each input data pulse is about 2 nanoseconds.

16. The de-skewing method for use with a source synchronous receiver circuit domain as set forth in claim 15, wherein said spread data pulse is stretched over a timing window of about 8 nanoseconds.

17. The de-skewing method for use with a source synchronous receiver circuit domain as set forth in claim 14, wherein said spread data pulses are multiplexed using two 2:1 MUX elements.

18. The de-skewing method for use with a source synchronous receiver circuit domain as set forth in claim 14, wherein each of said 2:1 MUX elements is controlled by a control signal manufactured from two of said four de-skew strobe signals.

19. A de-skewing circuit operable with respect to transferring data from a transmitter circuit domain to a receiver circuit domain, comprising:

means for generating a plurality of one-hot de-skew strobe signals based on at least an incoming strobe signal from said transmitter circuit domain;

means for registering, responsive to said one-hot de-skew strobe signals, each input data pulse from said transmitter circuit domain into a respective register so as to stretch each input data pulse into a spread data pulse over an extended timing window;

means for multiplexing data from said spread data pulses; and means for registering multiplexed data using a receiver circuit clock signal associated with said receiver circuit domain.

20. The de-skewing circuit operable with respect to transferring data from a transmitter circuit domain to a receiver circuit domain as set forth in claim 19, wherein said receiver, circuit clock signal is synchronous with a transmitter circuit clock, signal associated with said transmitter circuit domain.

21. The de-skewing circuit operable with respect to transferring data from a transmitter circuit domain to a receiver circuit domain as set forth in claim 19, wherein said means for registering said input data pulses comprises four de-skew registers, each operating responsive to a corresponding one of said one-hot de-skew strobe signals.

22. The de-skewing circuit operable with respect to transferring data from a transmitter circuit domain to a receiver circuit domain as set forth in claim 21, wherein said means for multiplexing comprises two 2:1 MUX elements, a first 2:1 MUX element operating to multiplex spread data pulse outputs of first and third de-skew registers and a second 2:1 MUX element operating to multiplex spread data pulse outputs of second and fourth de-skew registers.

23. The de-skewing circuit operable with respect to transferring data from a transmitter circuit domain to a receiver circuit domain as set forth in claim 22, wherein said means for registering said multiplexed data comprises a first data capture register operable to capture multiplexed data from said first 2:1 MUX element and a second data capture register operable to capture multiplexed data from said second 2:1 MUX element.

24. The de-skewing circuit operable with respect to transferring data from a transmitter circuit domain to a receiver circuit domain as set forth in claim 23, wherein each of said 2:1 MUX elements is controlled by a control signal manufactured from second and fourth de-skew strobe signals.

25. The de-skewing circuit operable with respect to transferring data from a transmitter circuit domain to a receiver circuit domain as set forth in claim 19, wherein said one-hot de-skew strobe signals are manufactured responsive to a pair of incoming strobe signals provided by said transmitter circuit domain.

26. The de-skewing circuit operable with respect to transferring data from a transmitter circuit domain to a receiver circuit domain as set forth in claim 25, wherein said means for generating said de-skew strobe signals comprises:

a first flip-flop whose clock input is coupled to a first one of said pair of incoming strobe signals;

a second flip-flop whose clock input is coupled to a second one of said pair of incoming strobe signals; and a combinational logic block coupled to outputs of said first and second flip-flops for generating said four de-skew strobe signals.

27. The de-skewing circuit operable with respect to transferring data from a transmitter circuit domain to a receiver circuit domain as set forth in claim 26, wherein said combinational logic block includes four 2-input AND gates, each for outputting a one-hot de-skew strobe signal.

28. The de-skewing circuit operable with respect to transferring data from a transmitter circuit domain to a receiver circuit domain as set forth in claim 27, wherein said input data pulses are clocked such that each input data pulse is about 2 nanoseconds.

29. The de-skewing circuit operable with respect to transferring data from a transmitter circuit domain to a receiver circuit domain as set forth in claim 28, wherein said spread data pulse associated with each input data pulse is about 8 nanoseconds.

* * * * *

UNITED STATES PATENT AND TRADEMARK OFFICE
CERTIFICATE OF CORRECTION

PATENT NO.         : 7,340,635 B2
APPLICATION NO.    : 10/376390
DATED              : March 4, 2008
INVENTOR(S)        : Rajakrishnan Radjassamy It is certified that error appears in the above-identified patent and that said Letters Patent is hereby corrected as shown below:

On sheet 4 of 7, in Box "602A", delete "Q" and insert -- Q' --, therefor.

In column 3, line 65, delete "m-d[l]" and insert -- m-d[1] --, therefor.

In column 5, line 64, in Claim 1, delete "deskew" and insert -- de-skew --, therefor.

In column 6, line 1, in Claim 1, delete "deskew" and insert -- de-skew --, therefor.

In column 6, line 49, in Claim 8, delete "flipflops" and insert -- flip-flops --, therefor.

In column 7, line 51, in Claim 20, after "receiver" delete ",".

In column 7, line 53, in Claim 20, after "clock" delete ",".

Signed and Sealed this

Fifteenth Day of July, 2008

JON W. DUDAS
*Director of the United States Patent and Trademark Office*